(12) United States Patent
Clüsserath et al.

(10) Patent No.: US 10,040,677 B2
(45) Date of Patent: Aug. 7, 2018

(54) RECEPTACLE TREATMENT MACHINE COMPRISING A SHIELDING SYSTEM

(71) Applicant: KHS GMBH, Dortmund (DE)

(72) Inventors: Ludwig Clüsserath, Bad Kreuznach (DE); Thomas Berger, Glashütten (DE)

(73) Assignee: KHS GmbH, Dortmund (DE)

( * ) Notice: Subject to any disclaimer, the term of this patent is extended or adjusted under 35 U.S.C. 154(b) by 137 days.

(21) Appl. No.: 15/106,573

(22) PCT Filed: Dec. 8, 2014

(86) PCT No.: PCT/EP2014/076863
§ 371 (c)(1),
(2) Date: Jun. 20, 2016

(87) PCT Pub. No.: WO2015/091050
PCT Pub. Date: Jun. 25, 2015

(65) Prior Publication Data
US 2017/0001847 A1 Jan. 5, 2017

(30) Foreign Application Priority Data
Dec. 20, 2013 (DE) .................. 10 2013 114 614

(51) Int. Cl.
*B67C 3/22* (2006.01)
*B67C 3/00* (2006.01)
(Continued)

(52) U.S. Cl.
CPC .............. *B67C 3/007* (2013.01); *B67C 3/06* (2013.01); *B67C 3/22* (2013.01); *B67C 3/24* (2013.01); *F16P 1/02* (2013.01); *F16P 1/04* (2013.01)

(58) Field of Classification Search
CPC .. B67C 3/007; B67C 3/24; B67C 3/06; B67C 3/22; F16P 1/04; F16P 1/02
See application file for complete search history.

(56) References Cited

U.S. PATENT DOCUMENTS 6,325,195 B1 * 12/2001 Doherty .................. F16P 3/08
160/120
6,708,956 B1 * 3/2004 Mangelsen ............ B23Q 11/08
256/24
(Continued)

FOREIGN PATENT DOCUMENTS

CA     2 272 198 A1    11/2000
DE     16 27 069 A      5/1970
(Continued)

*Primary Examiner* — Nicolas A Arnett
(74) *Attorney, Agent, or Firm* — Occhiuti & Rohlicek LLP

(57) ABSTRACT

A receptacle treatment-machine features a shield arranged along a region of the receptacle-treatment machine. The shield's cladding segments define a protection wall that catches receptacle shards hurled machine. These cladding segments are arranged following one another. Each segment hangs freely from an upper end thereof to form a pendulum or connects at an end thereof to the receptacle treatment machine by a working connection with an elastically deformable element. Lower ends of the cladding segments are beneath a level of treatment positions of the receptacle-treatment machine, beneath a level on which the receptacles rest on bases thereof as they move during treatment thereof, and beneath a level on which the receptacles are supported on lower regions thereof as they move during treatment thereof.

23 Claims, 11 Drawing Sheets

(51) Int. Cl.
*F16P 1/02* (2006.01)
*B67C 3/06* (2006.01)
*B67C 3/24* (2006.01)
*F16P 1/04* (2006.01)

(56) References Cited

U.S. PATENT DOCUMENTS

| | | | | |
|---|---|---|---|---|
| 6,922,944 | B1 * | 8/2005 | Krueger | F16P 1/00 49/163 |
| 6,987,241 | B2 * | 1/2006 | Hacker | B23Q 11/0825 160/222 |
| 7,992,598 | B2 * | 8/2011 | Elgan | B65D 77/061 141/10 |
| 8,272,179 | B2 * | 9/2012 | Mangelsen | F16P 1/00 52/239 |
| 8,833,724 | B2 * | 9/2014 | Marchio | F16P 1/02 248/637 |
| 9,003,704 | B2 * | 4/2015 | Giuliani | B65C 9/00 414/348 |
| 9,545,698 | B2 * | 1/2017 | Eichhammer | B65C 9/00 |
| 2012/0039692 | A1 * | 2/2012 | Giuliani | B65C 9/00 414/222.01 |
| 2012/0151739 | A1 * | 6/2012 | Marchio | F16P 1/02 29/428 |
| 2014/0306393 | A1 * | 10/2014 | Hafner | B65C 9/00 269/57 |

FOREIGN PATENT DOCUMENTS

| | | |
|---|---|---|
| DE | 30 29 755 A1 | 3/1982 |
| DE | 35 15 669 A1 | 12/1986 |
| DE | 93 06 138 U1 | 5/1994 |
| DE | 10 2010 004 002 B2 | 6/2011 |
| EP | 0 203 040 A1 | 11/1986 |
| EP | 2 583 932 A1 | 4/2013 |
| WO | WO 2010 099822 | 9/2010 |

* cited by examiner

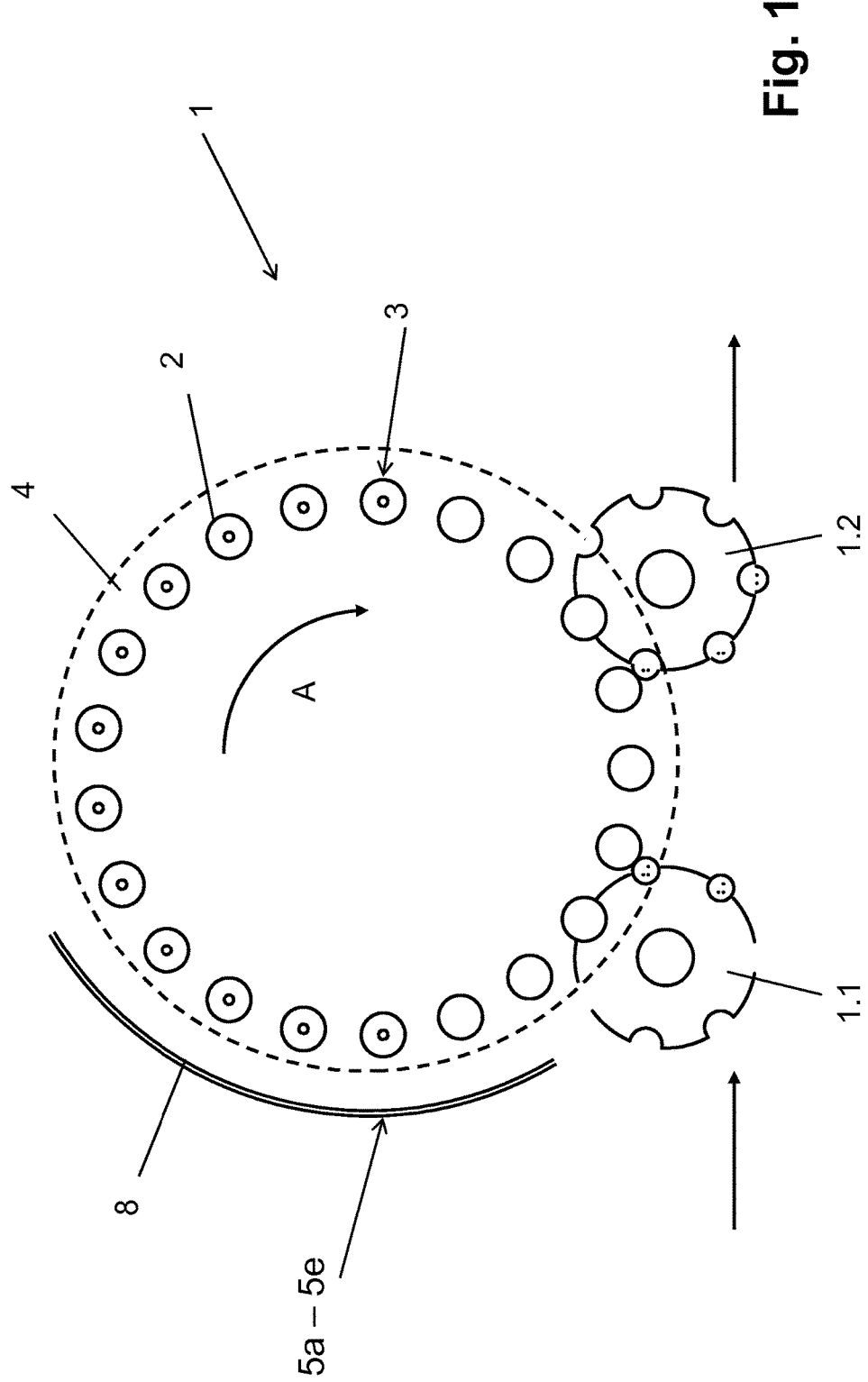

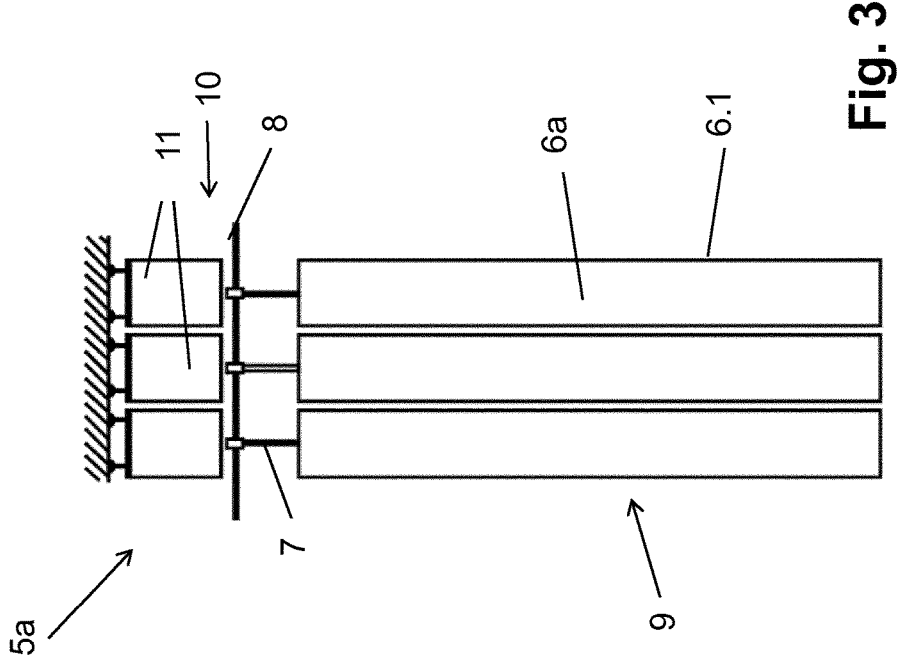
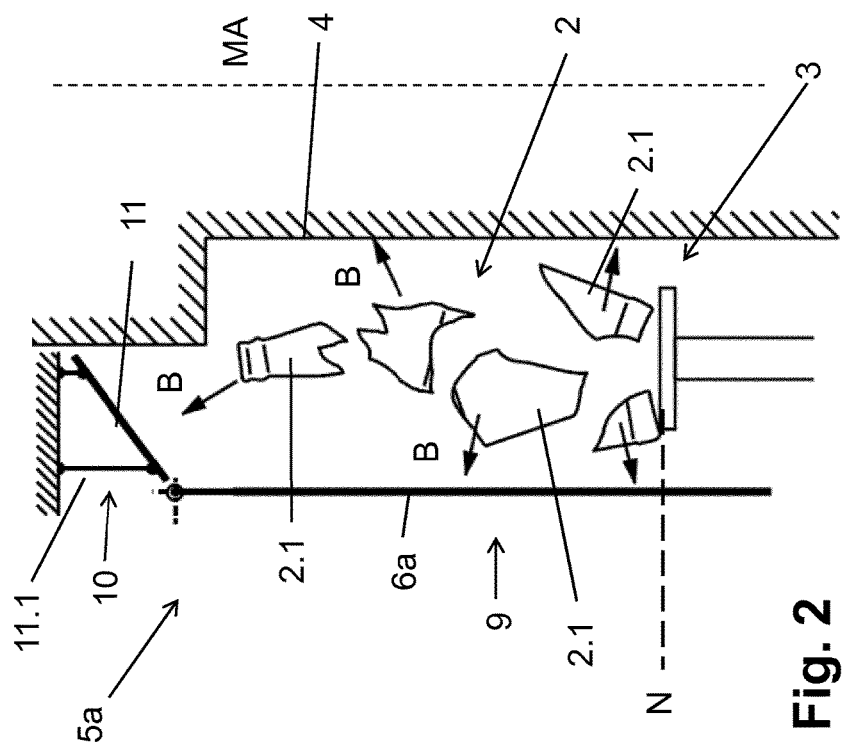

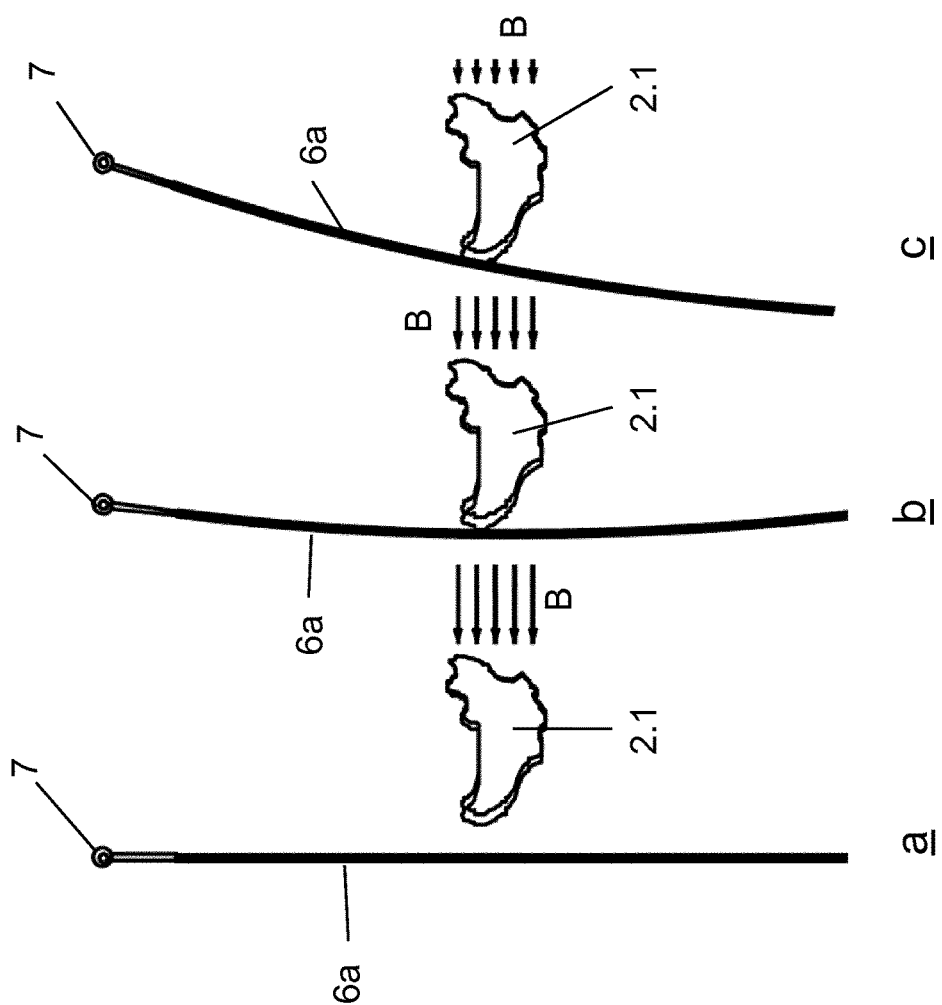

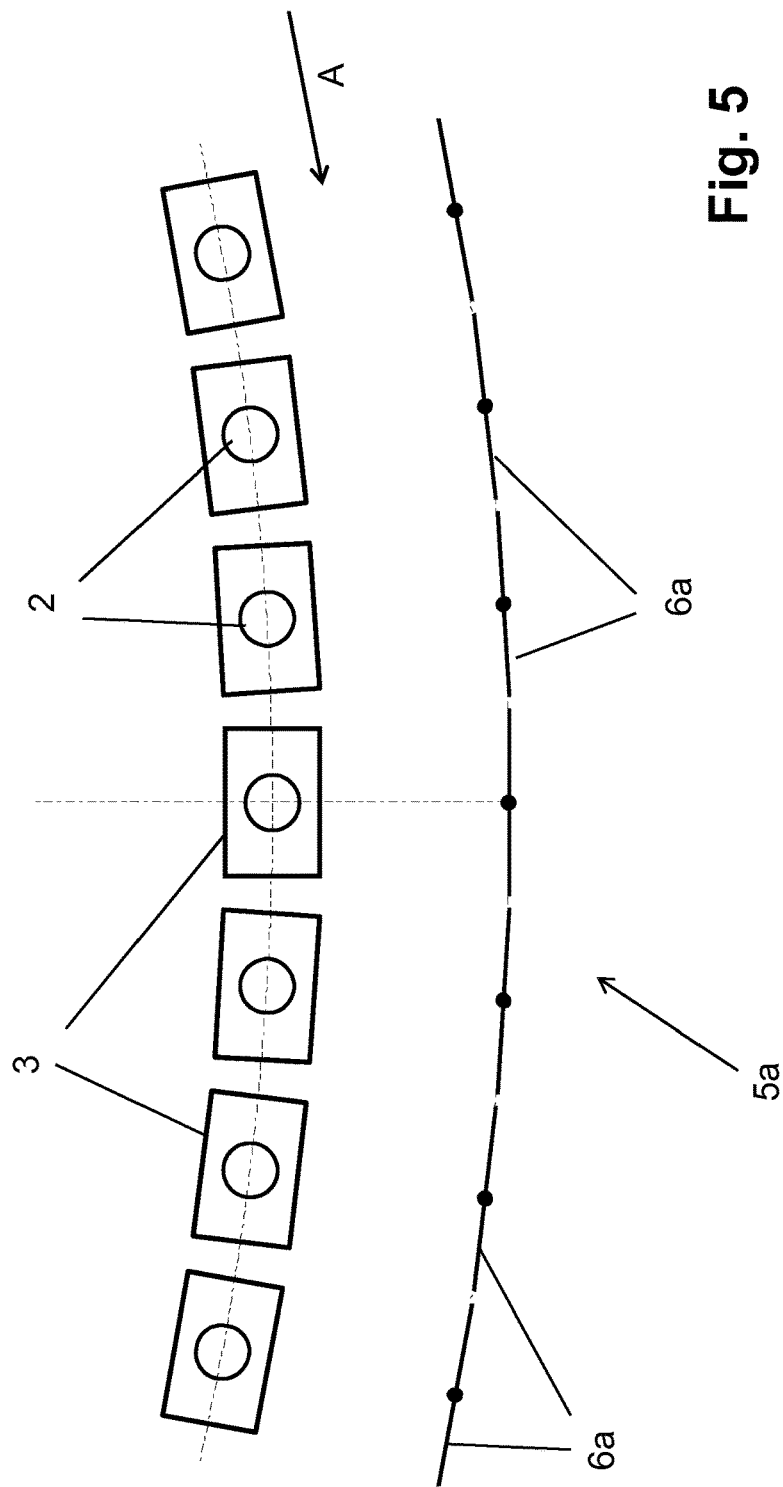

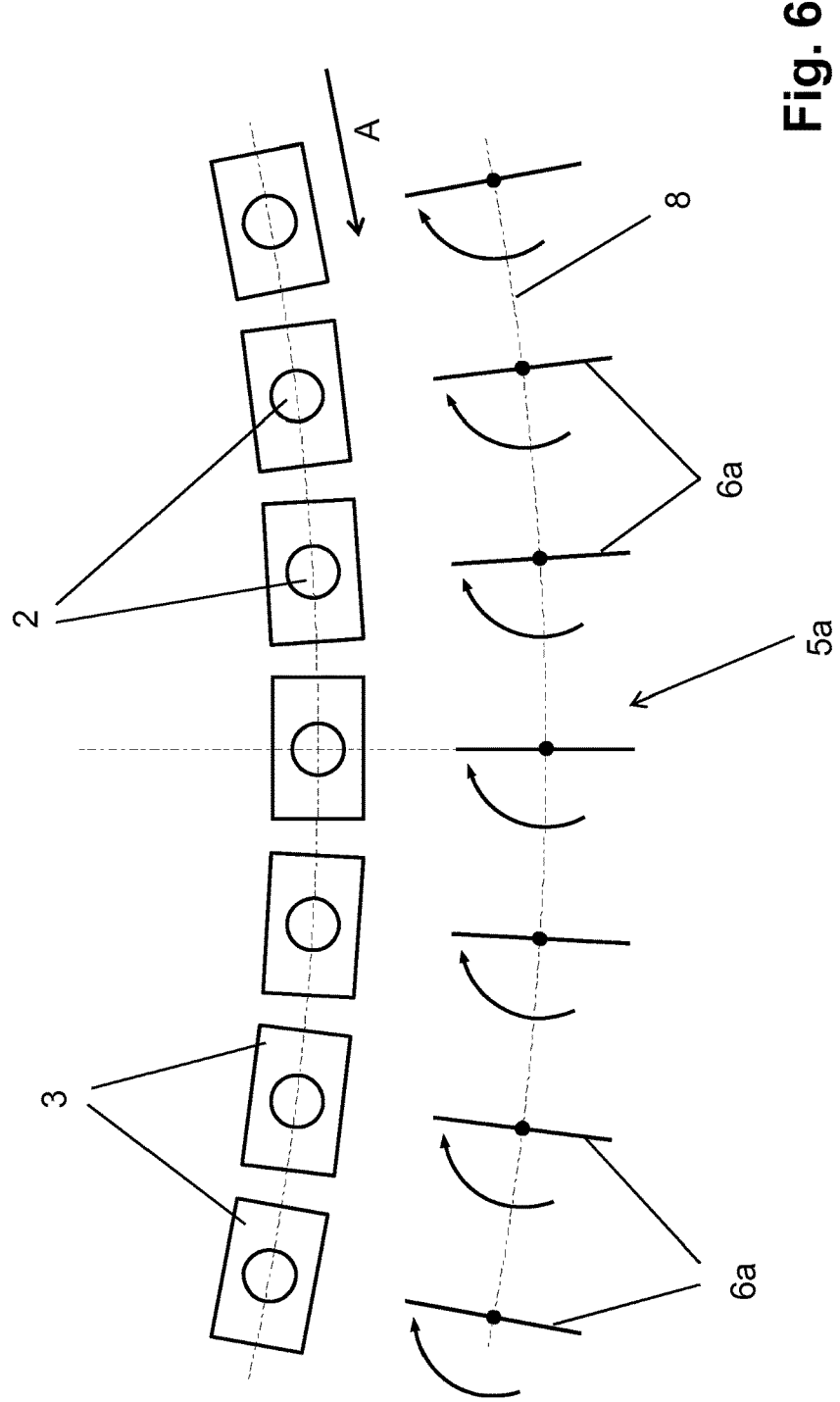

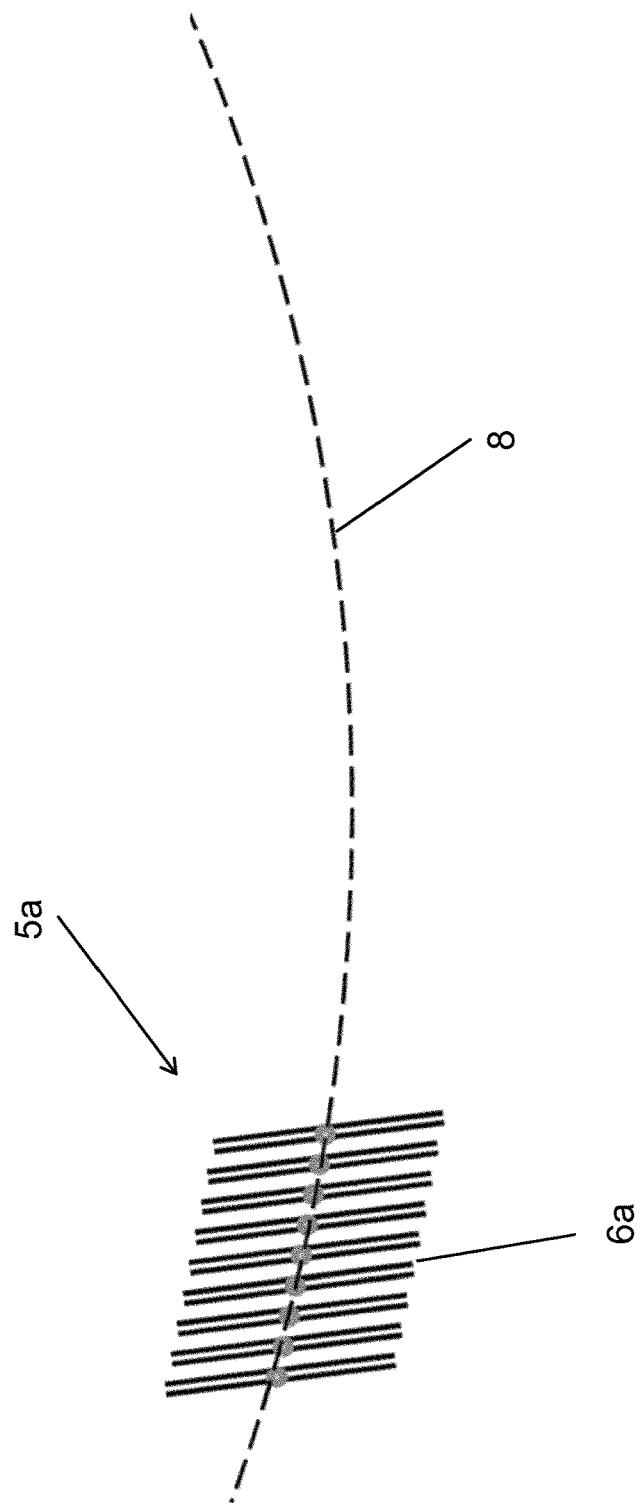

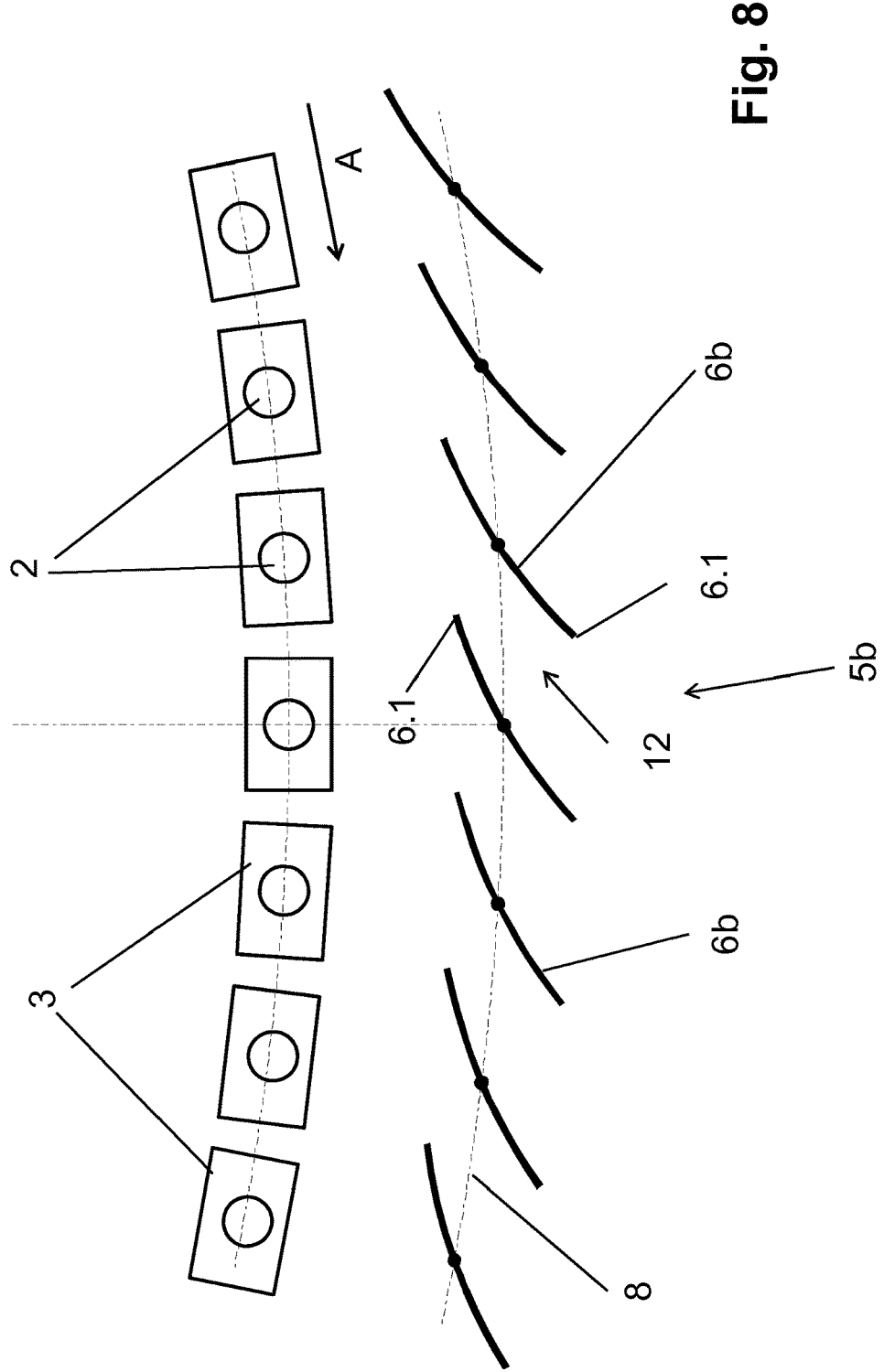

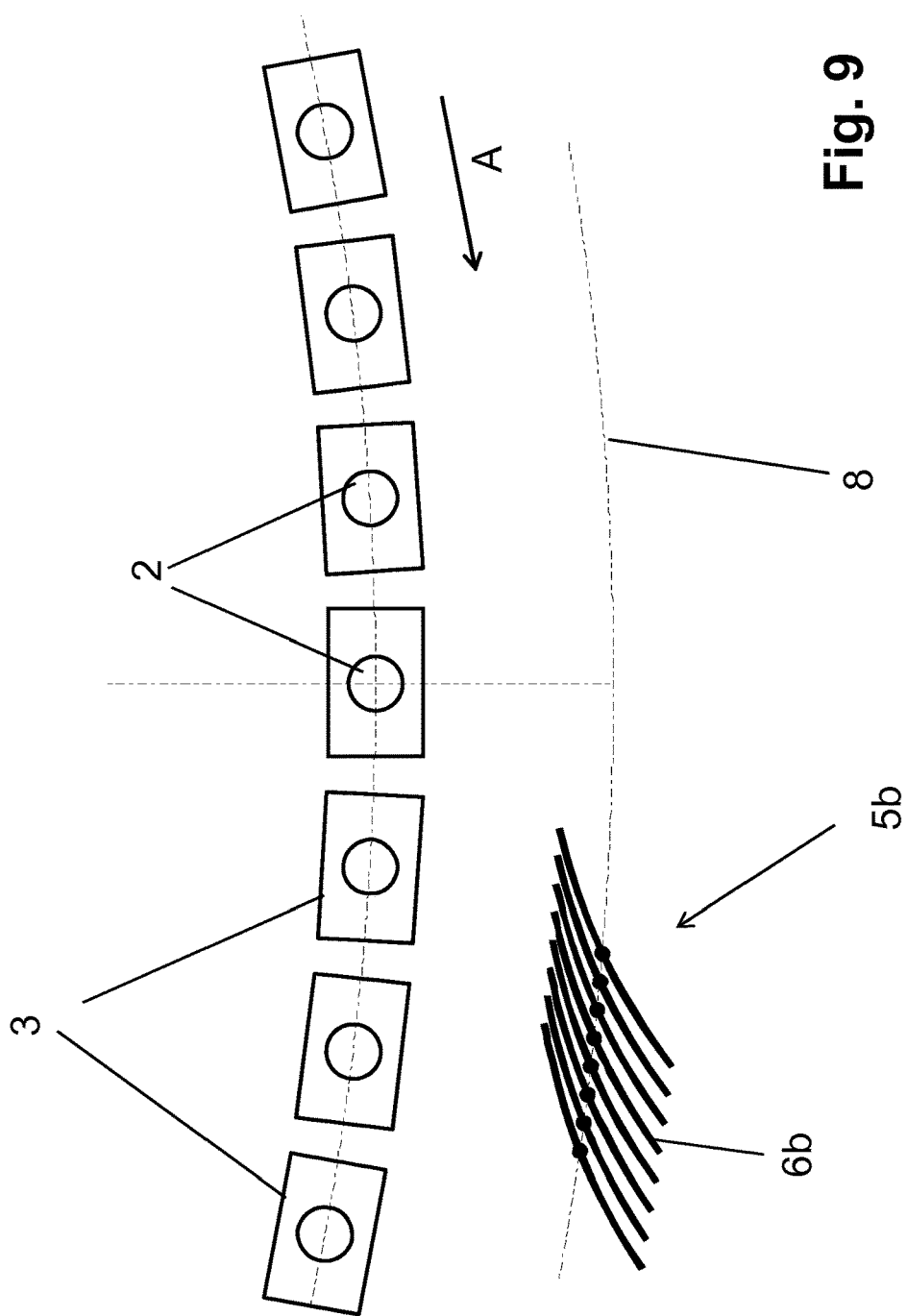

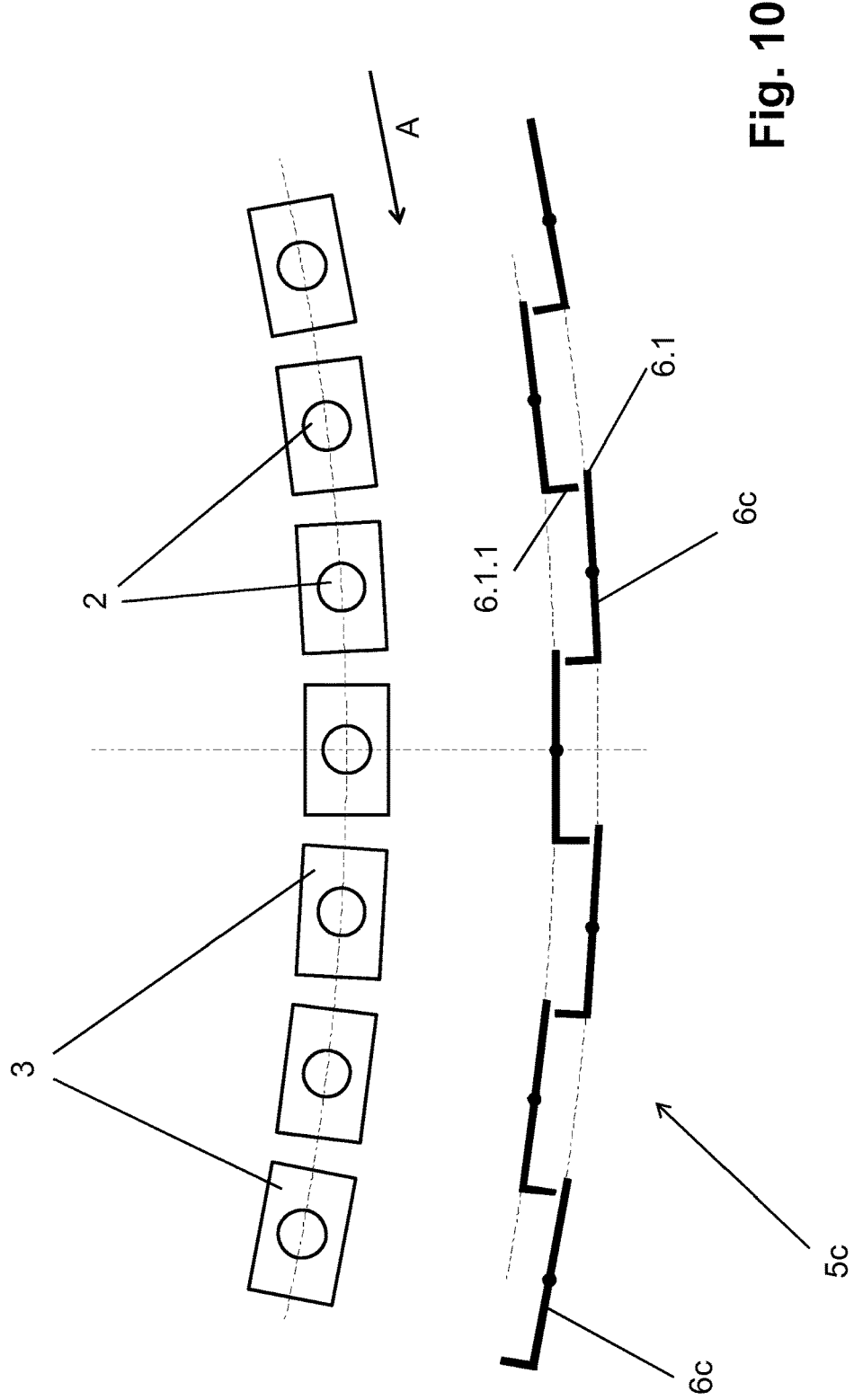

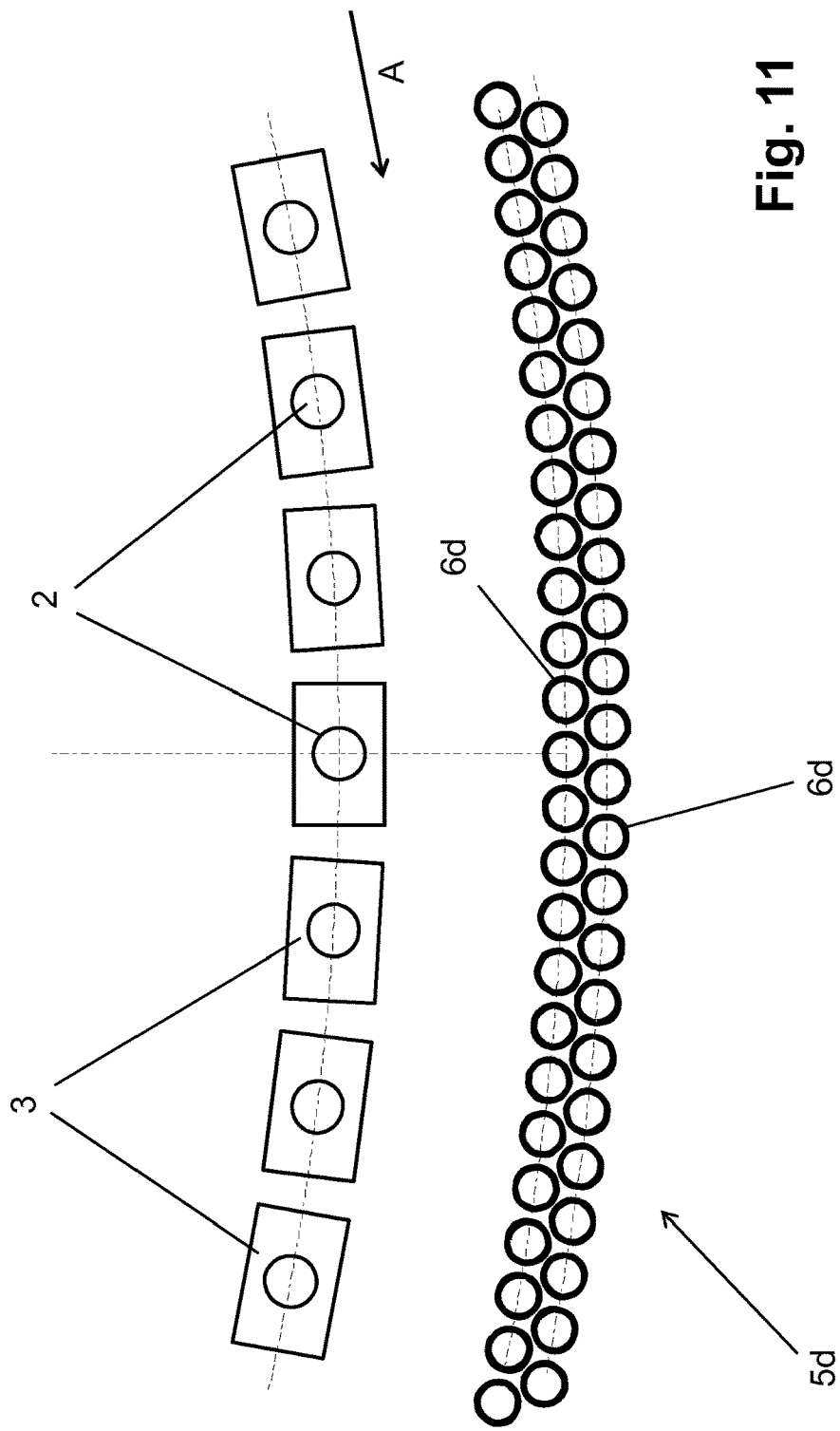

RECEPTACLE TREATMENT MACHINE COMPRISING A SHIELDING SYSTEM

RELATED APPLICATIONS

This is the national stage, under 35 USC 371 of international application PCT/EP2014/076863, filed on Dec. 8, 2014, which claims the benefit of the Dec. 20, 2013 priority date of German application DE 102013114614.7, the contents of which are herein incorporated by reference.

FIELD OF DISCLOSURE

The invention relates container processing, and in particular, to reducing damage resulting from container breakage during such processing.

BACKGROUND

When pressure-filling glass bottles, there is a risk that the bottle will burst because of the pressure. The resulting shards may cause damage. Such damage includes personal injury as well as damage to and contamination of adjacent machinery.

It is therefore known to provide shielding around areas in which this risk is greatest. Known shielding systems typically include wall elements made of steel sheets, positioned close to a rotor that has filling positions disposed along a periphery thereof. These steel sheets are typically fixed to the machine frame, not circulating with the rotor, of the receptacle-treatment machine. Disadvantageous in this situation is not only the fact that such shielding system must be dismantled with considerable effort for cleaning and maintenance work on the receptacle-treatment machine, but in particular also the fact that, in the event of receptacle breakage, the receptacle fragments incurred impact at high speed against the rigid and secured fixed wall elements, there break up further due to the impact, and, due to ricocheting off the wall elements, are in part propelled back in the direction of the receptacle-treatment machine. This results in further undesirable contamination of the receptacle-treatment machine and of the function elements of the treatment positions. In particular, the glass splinters and shards can also adhere to components or remain lying on them, such that, in the final analysis, the danger also pertains that glass splinters or shards will pass into the receptacles.

SUMMARY

An object of the invention is to provide a receptacle-treatment machine that avoids this disadvantage.

One particular feature of the invention lies in the fact that the shielding system is not formed from one or more rigid and fixed wall elements, but from a plurality of cladding segments, that, following from one to another, form a protective wall and that, in particular, are in each case held hanging from an upper end such as to move freely in pendulum fashion. As a result, in the event of the impact of receptacle fragments, the cladding segments can in each case deflect sideways with the fragments and in this situation absorb the kinetic energy of the fragments by conversion into potential energy, such that the receptacle fragments are caught by the cladding segments without further breakage occurring and without ricochet of the receptacle fragments on the shielding system.

The shielding system of the receptacle-treatment machine according to the invention can be cleaned and/or disinfected without any problem. With a preferred embodiment of the invention, the individual cladding segments are held suspended on at least one guide element, and in this situation can be displaced along this guide element in a manner similar to a venetian blind, such that the shielding system can be transferred without any problem from an effective state, in which the sequential cladding segments form the protective wall, into a non-effective state, in which there is free access, unimpeded by the shielding system, to the receptacle-treatment machine.

In terms of detail, the cladding segments can be of different configurations, for example as lamellar segments, which in each case consist of a section of a flat material, as a tubular element, as chains or chain lengths, wherein, in this case, each cladding segment is formed from at least one chain length hanging suspended, which comprises a plurality of chain elements.

The lamellar arrangement of the cladding segments has the particular advantage that these segments exhibit smooth surfaces that are easy to clean and disinfect, such that an optimum protective effect is achieved, together with the possibility of optimum cleaning and disinfection.

The cladding segments are preferably elastically deformable and consist, for example, of a metallic material or of plastic. The cladding segments further preferably exhibit such a length that they project downwards with their lower end beyond the level of the treatment positions of the receptacle-treatment machine and/or that level at which, during treatment, the receptacles move with their lower receptacle area, i.e. for example with their receptacle bases. The cladding segments extend, for example, as far as the floor on which the receptacle-treatment machine stands.

As used herein, "receptacles" refer to glass bottles that can break into rapidly moving shards or fragments.

As used herein, "pressure-filling" means a filling process with which the receptacles that are to be filled in each case are in contact against a filling element and, as a rule, before the actual filling phase, are subjected to pre-tension by a tension gas under pressure (inert gas or $CO_2$ gas), which then, during the filling, is increasing forced out of the receptacle interior as return gas by the filling product flowing into the receptacles. This pre-tension phase can be preceded by other treatment phases, such as an evacuation and/or flushing of the interior of the receptacle with an inert gas, such as $CO_2$ gas etc., likewise by way of gas paths formed in the filling element. Receptacles in the sealing position with a filling element of a filling machine signifies in this context that the respective receptacle is in contact with its receptacle mouth opening pressed tight against a filling element or a seal located there in the manner known to the person skilled in the art.

As used herein, "essentially" or "approximately" or "approx." refer to deviations from the exact value in each case by +/−10%, preferably by +/−5%, and/or deviations in the form of changes that are not of significance to function.

Further embodiments, advantages, and possible applications of the invention can be derived from the following description of exemplary embodiments and the figures. In this situation, all the features described and/or figuratively represented, individually or in any desired combination, are in principle the object of the invention, regardless of their incorporation in the claims or references to them. The contents of the claims are also a constituent part of the description.

BRIEF DESCRIPTION OF THE DRAWINGS

The invention is explained in greater detail hereinafter by way of exemplary embodiments, on the basis of the figures, in which:

FIG. 1 is a schematic view from above of a receptacle-treatment machine in the form of a filling machine for the pressure-filling of receptacles;

FIG. 2 is a schematic sectional representation of a treatment position of the receptacle-treatment machine from FIG. 1 together with a broken receptacle at this treatment position and a shielding system;

FIG. 3 is a schematic part representation of the shielding system of FIG. 2 in a side view;

FIG. 4 show, in the positions a-c, the behavior of the shielding system from FIGS. 1 and 2 with receptacle shards or receptacle fragments impacting on the cladding or its cladding segments;

FIG. 5-7 in each case, shows a view from above the lateral or vertical cladding segments of the shielding system from FIGS. 1 and 2 in an effective state (FIG. 5), in an open state (FIG. 6), and a folded state of the shielding system (FIG. 7);

FIGS. 8 and 9 show a representation similar to FIGS. 5 and 7, with a further embodiment of the shielding system according to the invention;

FIGS. 10 and 11 show a representation similar to FIG. 4, with further embodiments of the shielding system.

DETAILED DESCRIPTION

Figure 13:
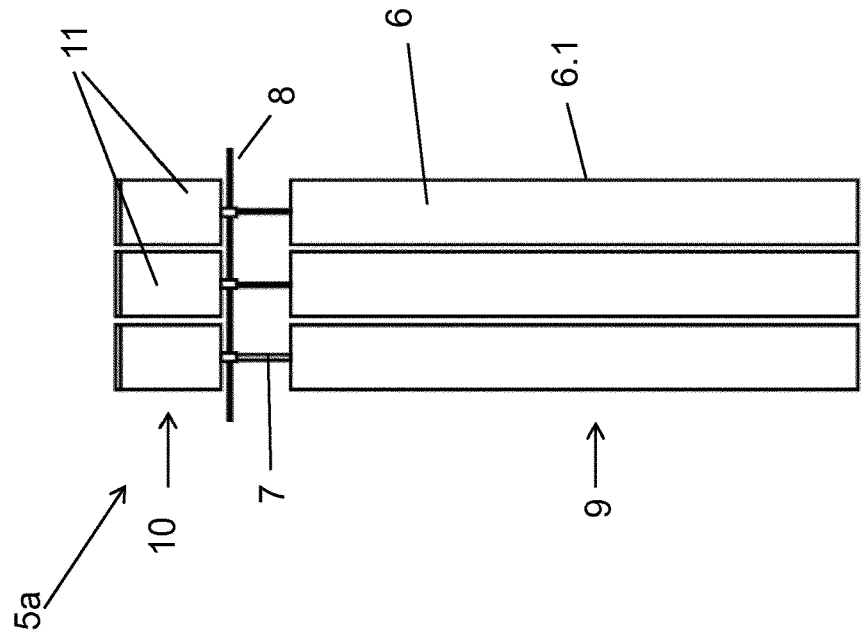
FIGS. 12 and 13 show representations as in FIGS. 2 and 3, with a further embodiment of the shielding system.

FIG. 1 shows a receptacle-treatment machine 1 for treatment of receptacles 2 made of glass or a similar non-metallic material. The receptacle-treatment machine 1 is configured as a rotating machine having receptacle-treatment positions 3 that are provided at the circumference of a rotor 4 that rotates about a vertical machine axis MA. With the rotor 4 circulating in a rotor direction A, receptacles 2 that are to be treated are conducted to the receptacle-treatment positions 3 by way of a receptacle inlet 1.1.

The treatment of receptacles 2 is carried out within an angular region of the rotor's movement. This angular region extends between the receptacle inlet 1.1 and a receptacle outlet 1.2, at which the treated receptacles 2 are taken from the treatment positions 3.

In some embodiments, the receptacle-treatment machine 1 is a filling machine for pressure-filling receptacles 2 with a filling product. In pressure-filling, the receptacles 2, which stand on their bases on a horizontal level N, are pre-tensioned to a filling pressure with a pressurized inert gas. This occurs while the receptacles are in a tension zone, before actually filling the receptacles with the liquid filling-product.

In the region of this tension zone, there is a risk of a receptacle 2 bursting. This may arise, for example, from previous damage to the receptacle 2 as a result of thermal loads during a previous cleaning procedure. When a receptacle 2 bursts, the resulting shards or receptacle fragments 2.1 move at high speed, and therefore with high kinetic energy from the receptacle-treatment position 3 in uncontrollably different directions B, as shown in FIG. 2. These shards move in all directions.

To avoid injury to personnel and damage to machines located adjacent to the receptacle-treatment machine 1, it is useful to provide a shielding system in the tension zone. In some cases, the shielding system comprises rigid and fixed wall elements. Although such shielding systems prevent the receptacle fragments 2.1 from being hurled outwards, shards that impact them often ricochet and undergo further breakage. In many cases, the ricochet directs the shards back toward the receptacle-treatment machine 1. This can contaminate components of the receptacle-treatment machine 1 with receptacle fragments 2.1. The contamination hinders cleaning of the receptacle-treatment machine 1.

FIG. 2-6 show an alternative shielding system 5a that avoids these difficulties. This shielding system 5a includes cladding segments 6a, each of which is configured in the form of lamellae and comprises a rectangular structural element. In the normal state of the shielding system 5a, these cladding segments 6a are arranged with longitudinal sides 6.1 of this shape arranged in the vertical direction. A carrier element 7 on a guide 8 holds each cladding segment 6a at its upper end, i.e. at the narrow side at that point of the structure. As a result, the cladding segment 6a hangs freely like a pendulum.

The guide 8, as shown in FIG. 1 extends in from an arc of a circle about the rotor 4, along the tension zone. In the embodiment represented, the lower ends of the cladding segments 6a are located below the level N.

The carrier elements 7 move the cladding segments 6a along the guide 8, while at the same time enabling them to pivot about their vertical middle axes. As a result, the cladding segments 6a corresponding to FIGS. 3 and 5 can be arranged in an effective state, in which the cladding segments 6a are connected to one another and form a continuous vertical protection wall 9 of the shielding system 5a. This can be opened, wholly or partially, by pivoting the cladding segments 6a about their vertical middle axis, in order, for example, to provide access to the treatment positions 3, as represented in FIG. 6.

FIG. 7 shows the cladding segments 6a after having adopted a state in which they are pushed together and with their planes radial or essentially radial to the machine axis MA. This permits unimpeded access through the shielding system 5a to the receptacle-treatment machine 1, and in particular also to the treatment positions 3 and the function elements located therein.

FIG. 4 shows the shielding system 5a and its cladding segments 6a in operation. In particular, diagram (a) of FIG. 4 shows a broken fragment 2.1 of a receptacle flying into a cladding segment 6a. Upon being impacted by this receptacle fragment 2.1, this cladding segment 6a deflects sideways. Simultaneously, the cladding segment 6a assumes an elastic concave camber on the side facing towards the receptacle fragment 2.1, as shown in diagram (b). In its further course, the cladding segment 6a, with the receptacle fragment 2.1 in contact or coming in contact, deflects outwards until the point at which the kinetic energy of the receptacle fragment 2.1 has at least for the most part been converted into potential energy of the cladding segment 6a. As a result, the cladding segment 6a decelerates and catches the receptacle fragment 2.1.

An upper protection wall 10, shown in FIGS. 2 and 3, catches receptacle fragments 2.1 that are projected upwards from the treatment position 3. The upper protection wall 10 is formed from upper cladding segments 11 that are produced with a rectangular cross-section and that connect with one another along the shielding system 5a when it is in its effective state.

The upper cladding segments 11 are suspended so that they hang freely at the holding elements 11.1. This means that they too can deflect outwards sorb kinetic energy upon being hit by receptacle fragments 2.1. Due to the elastic deformation and/or deflection of the cladding segments 6a upon being hit by receptacle fragments 2.1, a large part of the kinetic energy of these fragments 2.1 is converted into potential energy of the cladding segments 6a. This also discourages further fragmentation of the receptacle fragments 2.1 and, in particular, ricocheting of these receptacle fragments 2.1 in the direction of the treatment machine 1. The cladding elements 6a convert their potential energy back into kinetic energy by reverting to their respective initial positions. As they do so, they give up this energy to internal and external friction and air resistance. These combine to dampen the movement of the cladding elements 6a so that the potential energy can be dispersed without any undesirable consequences.

Because the cladding elements 6a in the pushed together position, shown in FIG. 7, are still spaced apart from one another, this position is also particularly well-suited for the cleaning and/or disinfection of the cladding segments 6a, and specifically by spraying them with a suitable cleaning and/or disinfection medium.

FIGS. 8 and 9 show the cladding segments 6b of the vertical protection wall 9 of a shielding system 5b in the effective state (FIG. 8) and in the completely opened state of this shielding system, i.e. with the cladding segments 6b pushed together (FIG. 9). This alternative shielding system 5b differs from the shielding system 5a essential only in that the lamellar-type cladding segments 6b, at least in the starting position, are slightly cambered about at least one axis parallel to their vertical longitudinal extensions, and specifically in such a way that the convex cambered side, in the effective state of the shielding system 5b, faces towards the receptacle-treatment machine 1. Furthermore, the cladding segments 6b, which in turn are held freely hanging at their upper end only in pendulum fashion and are entirely free at the lower end, are set obliquely in the effective state of the shielding system 5b (FIG. 8) and arranged in such a way that, with two adjacent cladding segments 6b, the longitudinal edge 6.1 of the one cladding segment 6b of the receptacle-treatment machine 1 lies closer than the longitudinal edge 6.1, adjacent to this longitudinal edge 6.1 of the other cladding segment 6b. As a result of this, a gap 12 forms between the adjacent cladding segments 6b, oriented obliquely to the circumference of the rotor 4, for example for the passage of an air flow produced by the circulating rotor 4, but nevertheless the cladding segments 6b following one another still overlap in an axial direction radially or essentially radially to the machine axis MA sufficiently far for the receptacle fragments 2.1 moved or thrown outwards from the treatment machine 1 or from the treatment positions 3 respectively will be reliably caught by the shielding system 5b in the manner described heretofore.

FIG. 10 shows a further embodiment in which a shielding system 5c with a plurality of lamellar cladding segments 6c forms the vertical protection wall of this cladding, which in each case are provided on one of their longitudinal sides 6.1 with an angle arrangement 6.1.1. For the pendulum-type suspension of the cladding segments 6, two guides 8 are provided. The two guides 8 are offset radially to the machine axis by an amount that is equal to or essentially equal to the length of the angle arrangements 6.1.1. In the effective state represented in FIG. 10 of the shielding system 5c, the angle arrangement 6.1.1 of a cladding segment 6c lies against the adjacent cladding segment 6c or is adjacent to this, and specifically on the longitudinal side 6.1 that does not comprise the angle arrangement 6.1.1.

FIG. 11 shows a representation similar to that in FIG. 10 and in the effective state of a shielding system 5d with a plurality of cladding segments 6d. These cladding segments 6d are not configured in lamellar manner. Instead, they are formed from tubular elements that are held at their upper ends on two guides so as to hang freely as pendulums, and specifically in such a way that the cladding segments 6d, at least in the effective state of the shielding system 5d, form two rows and from row to row are set forward with a gap.

Figure 12:
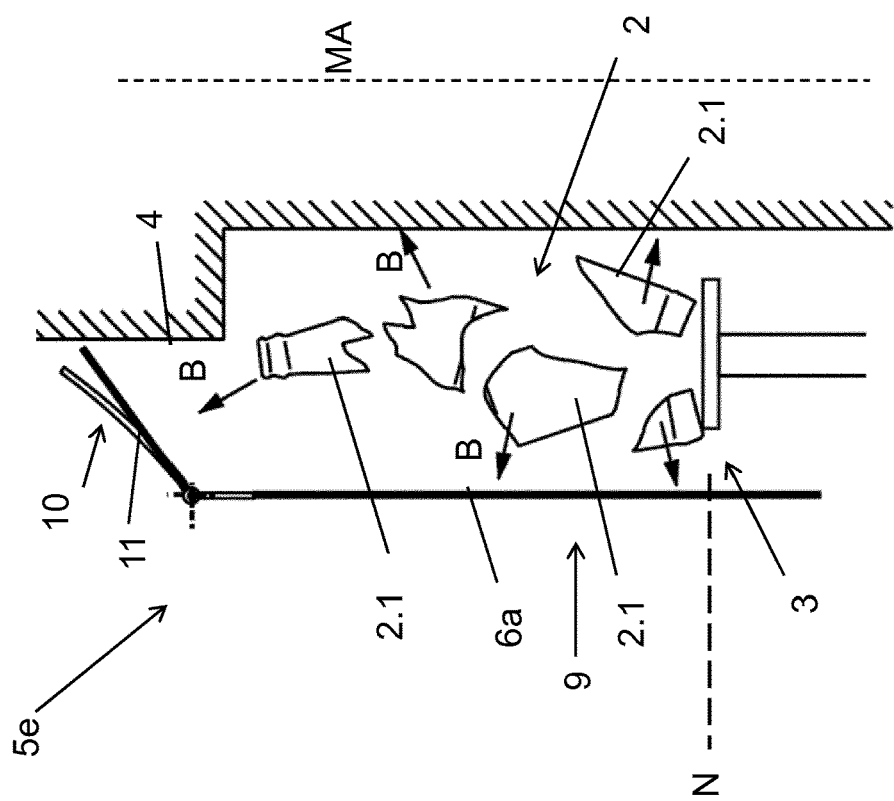

FIGS. 12 and 13 show representations corresponding to FIGS. 2 and 3 of a shielding system 5e that differs from the shielding system 5a-5c only in that the upper cladding segments 11 are not held hanging at the respective suspension point 11.1, but are tensioned at the guide 8. These cladding segments 11, upon being hit by receptacle fragments 2.1, deflect elastically in order to absorb and eliminate the kinetic energy.

Widely differing materials are suitable for producing the cladding segments 6a-6d and 11, but plastics are preferred. In a particularly advantageous embodiment, at least the cladding segments 6a-6d are made of a transparent material, for example of polycarbonate. As a result, even with the shielding system 5a in the effective state, it is possible to see the treatment of the receptacles at the treatment positions 3. By suitably selecting a cladding segment's size and the material from which it is made, it is possible to ensure that its mass is at least equal to or preferably greater than the mass of the largest receptacle fragment 2.1 to be anticipated. In certain embodiments, the mass of each cladding segment 6a-6d amounts to less than 50% of the mass of the receptacles 2.

In particular when the cladding segments 6a-6d and 11 consist of a non-metallic material, they are provided, at least on that surface side which in the effective state of the shielding system 5a-5e faces towards the treatment machine 1 and its rotor 4 respectively, with a flexible and/or elastic coating. This coating prevents damage to this surface side that might otherwise result from impact by receptacle fragments 2.1 and/or the penetration of receptacle fragments 2.1. A suitable coating is one with a higher hardness value than that of the cladding segments 6a-6d and 11. This coating is then arranged so as to be either continuous or formed from a plurality of adjacent coating regions or particles. Suitable materials include glass, or also particles of a hard material, such as particles of glass or particles of metal. It is understood that this coating is applied sufficiently thinly onto the cladding segments 6a-6d and 11 so that the flexibility and elasticity of these segments is retained.

In addition to the configuration described of the cladding segments 6a-6d, there is also the possibility of providing lengths of chain as cladding segments. These hang at the guide 8 and are otherwise free. Each cladding segment then comprises at least one length of chain with a plurality of chain links. The latter consist in turn of a metallic material or of plastic.

It has been assumed that the shielding system 5a-5e at the receptacle-treatment machine 1 is used in a filling machine. It is of course possible for the shielding system to be used also with other receptacle-treatment machines in critical zones or regions in which there is a risk of receptacle breakage with receptacle fragments being moved or hurled away from the machine, for example by centrifugal force.

It has also been assumed heretofore that the cladding segments 6a-6d are arranged at the receptacle-treatment machine 1 for the formation of the protection wall 9 following on from one another, and in each case are held hanging freely in pendulum fashion, by their upper ends only. This is not essential, however. In some embodiments, the cladding elements 6a-6d are accommodated elastically at least at one of their ends. It is to be understood by this that the cladding elements are connected via a working connection to an elastically deformable element, to its mounting, and/or to the receptacle-treatment machine. If, with this embodiment, a glass splinter or a glass shard now impacts a cladding element 6a-6d, it is capable of undergoing further elastic deformation.

In addition, however, the elastic mounting element is also elastically deformed. When the effect of the glass splinter or glass shard has ended, the elastically deformable element reverts to its original overall arrangement, wherein, however, a part of the energy stored by the elastic deformation is converted by inner or outer friction processes into heat. This reduces the effects of shattering glass bottles or similar receptacles made of glass.

The invention has been described heretofore on the basis of exemplary embodiments. It is understood that numerous modifications and divergences are possible without thereby leaving the inventive concept on which the invention is based.

The invention claimed is:

1. An apparatus comprising a receptacle treatment-machine and a shield arranged along a region of said receptacle-treatment machine, wherein said shield comprises cladding segments that define a protection wall, wherein said protection wall catches receptacle shards that have been hurled from said receptacle-treatment machine, wherein, for formation of said protection wall, said cladding segments are arranged following one another, wherein each of said cladding segments is in one of a first state and a second state, wherein, in said first state, said cladding segment hangs freely from an upper end thereof to form a pendulum, and wherein, in said second state, said cladding segment is connected at an end thereof to said receptacle treatment machine by a working connection with an elastically deformable element, and wherein lower ends of said cladding segments are located at one of a first location, a second location, and a third location, wherein said first location is beneath a level of treatment positions of said receptacle-treatment machine, wherein said second location is beneath a level on which said receptacles rest on bases thereof as they move during treatment thereof, and wherein said third location is beneath a level on which said receptacles are supported on lower regions thereof as they move during treatment thereof.

2. The apparatus of claim 1, wherein each of said cladding segments is lamellar.

3. The apparatus of claim 1, wherein each of said cladding segments comprises a tube.

4. The apparatus of claim 1, wherein each of said cladding segments comprises chain links connected to each other.

5. The apparatus of claim 1, wherein each of said cladding segments comprises a length of chain.

6. The apparatus of claim 1, wherein each of said cladding segments is lamellar, wherein each of said cladding segments is rectangular, wherein each of said cladding segments is flat.

7. The apparatus of claim 1, wherein each of said cladding segments is lamellar, and wherein each of said cladding segments has a camber about a longitudinal axis of said cladding segment.

8. The apparatus of claim 1, wherein each of said cladding segments is lamellar, wherein each of said cladding segments has a first portion and a second portion, and wherein said first and second portions define an angle between them.

9. The apparatus of claim 1, wherein each of said cladding segments is lamellar, and wherein each of said cladding segments is pivotable about a longitudinal axis thereof, and wherein pivoting said cladding segments opens said shield.

10. The apparatus of claim 1, wherein each of said cladding segments is lamellar, and wherein said cladding segments are movable so as to be pushed together with surfaces facing each other to form a stack, wherein, when said cladding segments have been pushed together, said shield is open.

11. The apparatus of claim 1, further comprising an upper guide, wherein said upper guide holds said cladding segments.

12. The apparatus of claim 1, further comprising an upper guide along which said cladding segments, which are held by said upper guide, are displaceable.

13. The apparatus of claim 1, wherein said shield comprises an upper protection wall that is formed from additional cladding segments.

14. The apparatus of claim 13, wherein said additional cladding segments hang freely next to one another.

15. The apparatus of claim 13, wherein said additional cladding segments are held for elastic deflection.

16. The apparatus of claim 13, wherein said additional cladding segments are flat.

17. The apparatus of claim 1, wherein said cladding segments are transparent.

18. The apparatus of claim 1, wherein said cladding segments comprise polycarbonate.

19. The apparatus of claim 1, wherein said cladding segments comprise metallic material.

20. The apparatus of claim 1, further comprising a coating, wherein each of said cladding segments comprises a side that faces said receptacle-treatment machine, wherein said coating coats said side, and wherein said coating has a hardness that is greater than that of said cladding segment.

21. The apparatus of claim 20, wherein said coating is thin, flexible, and elastic.

22. The apparatus of claim 20, wherein said coating comprises glass.

23. The apparatus of claim 20, wherein said coating comprises metal.

* * * * *